(12) United States Patent
Udeshi et al.

(10) Patent No.: US 9,275,092 B2
(45) Date of Patent: Mar. 1, 2016

(54) METHODS AND SYSTEMS FOR ENCODING THE MAXIMUM RESOLUTION DATA LEVEL FOR A QUADTREE

(71) Applicant: GOOGLE INC., Mountain View, CA (US)

(72) Inventors: Tushar Udeshi, Broomfield, CO (US); Emil Constantin Praun, Union City, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/507,499

(22) Filed: Oct. 6, 2014

(65) Prior Publication Data

US 2015/0026216 A1 Jan. 22, 2015

Related U.S. Application Data

(62) Division of application No. 13/018,336, filed on Jan. 31, 2011, now Pat. No. 8,856,184.

(51) Int. Cl.
*G06F 7/00* (2006.01)
*G06F 17/30* (2006.01)

(52) U.S. Cl.
CPC ............ *G06F 17/30327* (2013.01); *G06F 7/00* (2013.01); *G06F 17/30241* (2013.01); *G06F 17/30961* (2013.01)

(58) Field of Classification Search
CPC ..................... G06F 17/30961; G06F 17/30327
USPC ................................................. 707/797, 796
See application file for complete search history.

(56) References Cited

U.S. PATENT DOCUMENTS

| 6,868,420 | B2 | 3/2005 | Perry et al. | |
|---|---|---|---|---|
| 6,959,304 | B1 | 10/2005 | Teig et al. | |
| 7,366,736 | B1 * | 4/2008 | Woodard | 345/428 |
| 2001/0039487 | A1 | 11/2001 | Hammersley et al. | |
| 2007/0174309 | A1 * | 7/2007 | Pettovello | 707/100 |
| 2011/0145228 | A1 * | 6/2011 | Laurenzo et al. | 707/723 |
| 2011/0295789 | A1 | 12/2011 | Shacham et al. | |
| 2011/0316854 | A1 * | 12/2011 | Vandrovec | 345/420 |

OTHER PUBLICATIONS du Mouza et al. "Large Scale Indexing of Spatial Data in Distributed Repositories: the SD—Rtree." VLDB Journal (2009) 18:933-958.*

* cited by examiner

*Primary Examiner* — Charles Lu
(74) *Attorney, Agent, or Firm* — Marshall, Gerstein & Borun LLP

(57) ABSTRACT

A method and system for searching for data covered by nodes in a quadtree are disclosed. Nodes at a selected level of the quadtree are encoded with an index. The index nodes store data related to the level of descendants and ancestors of each index node. To search for data covered by a particular desired node, the index node ancestor or descendant of the desired node is determined. Based on the data in the index node, the desired node can be located without a full traversal of the quadtree. The quadtree nodes store elevation data for points on the Earth.

11 Claims, 7 Drawing Sheets

METHODS AND SYSTEMS FOR ENCODING THE MAXIMUM RESOLUTION DATA LEVEL FOR A QUADTREE

CROSS REFERENCE TO RELATED APPLICATIONS

This application is a divisional of U.S. patent application Ser. No. 13/018,336 filed Jan. 31, 2011 entitled "Methods and Systems for Encoding the Maximum Resolution Data Level for a Quadtree," the entire disclosure of which is hereby expressly incorporated by reference therein.

TECHNICAL FIELD

This field relates to elevation data in geographic information systems and applications thereof.

BACKGROUND

Mapping applications accessible over the Internet allow users to view desired areas of the Earth and also determine walking and biking directions along specified paths. To provide a further level of detail to a particular user, elevation data for a specific point on the Earth, or points along a specified path, may be desired.

SUMMARY

Embodiments relate to methods and systems of retrieving data for one or more points covered by nodes in a quadtree stored in a database. The points represent locations on the Earth's surface or on the ocean floor. Data stored in the nodes of the quadtree contain elevation data for the locations on the Earth's surface or on the ocean floor.

In an embodiment, a method of indexing an existing quadtree is disclosed. A level of the quadtree is specified to be the index level. The method encodes nodes at the index level of the quadtree with data representing the highest resolution data available under the index node at a particular position.

In a further embodiment, an indexed quadtree stored in a database is used to return the highest resolution data available in the quadtree with a minimal number of database lookups. Using the indexed quadtree, the index node covering a desired point is retrieved from a database. Based on the data in the index node, the level and position of the node of highest resolution data available covering a desired point is determined. Using the level and position of the node, the node is located and retrieved from the database. The information stored in the node can then be used to return data related to the desired point.

Further embodiments, features, and advantages of the invention, as well as the structure and operation of the various embodiments of the invention are described in detail below with reference to accompanying drawings.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1A:
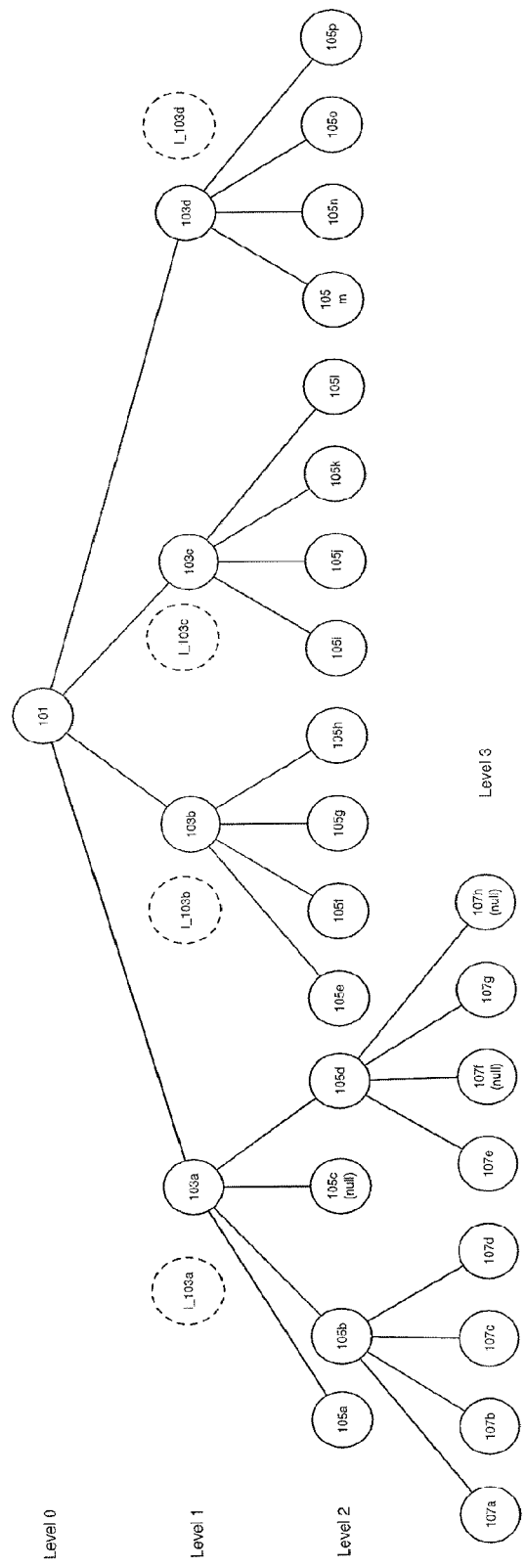
FIG. 1A is an exemplary quadtree structured as a tree.

Embodiments relate to determining the elevation of points on the Earth in geographic information systems software. The elevation of each point or an area surrounding each point may be stored in quadtree nodes stored in a database. To reduce the number of database lookups required to retrieve quadtree nodes from the database, the quadtree may be provided with an index. Embodiments relate to methods and systems of indexing a quadtree and retrieving nodes from an indexed quadtree to provide quicker elevation results.

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Geographic information systems provide users with representations of various locations around the Earth, and data related to those locations. Data may be related to features of the land at the location, such as streets and buildings. Additionally, data may be related to population and used for various analytics, such as tracking migrations of people from one location to another. One use of geographic information systems is to enable users to determine the elevation of a point or an area.

Google Maps by Google Inc. of Mountain View, Calif. is a web-based mapping service which offers street maps, satellite images, travel directions, and other services to users for numerous countries around the world. Google Maps also allows third parties to access the data used in the Google Maps service via an API, or application programming interface. The interface allows software developers to access the data and present it to users in desired formats.

One service provided through the Google Maps API is the Google Elevation API. The Elevation API provides users a simple interface to determine the elevation of a point on the Earth, or the elevation of a path spanning multiple points. Elevation data may be used for various applications, such as providing elevation data for hiking paths, biking paths, or marathon routes.

For example, a user on a walking tour of Washington D.C. may want to determine the elevation of a point in front of the Lincoln Memorial. Using the Google Maps Elevation API, the user may enter the latitude and longitude of such a desired point, such as 38.889288 and 77.049707. The Elevation API may return 8.3244791 meters, which is the elevation of the point above sea level.

Quadtrees

Elevation data may be stored in a database characterized by a quadtree structure. A quadtree is a hierarchical data structure, which is similar in some ways to a binary tree. Quadtrees are composed of nodes and leaves. Nodes are elements which have children node descendants. Leaves, meanwhile, are node elements which have no children. In a quadtree, each parent node has exactly four children descendants. FIG. 1A displays an exemplary quadtree represented as a tree structure. The root node 101 has exactly four children, 103a-103d. Each node at level 1 also has four children, as shown at level 2. Both nodes and leaves may contain various types of data.

Elevation data may be stored in rows of a database. In the quadtree structure, each row of the database may be represented as a node or leaf. In a quadtree containing elevation data, for example, each node may represent a database row for a region of land, and also contain information related to the children of that node.

Quadtrees may be used in conjunction with a two-dimensional map. Such quadtrees may be used to divide a two-dimensional map into four partitions, and sub-divide the created partitions further depending on the data contained in the two-dimensional map. An example of a grid-type quadtree is shown in FIG. 1B.

Figure 1B:
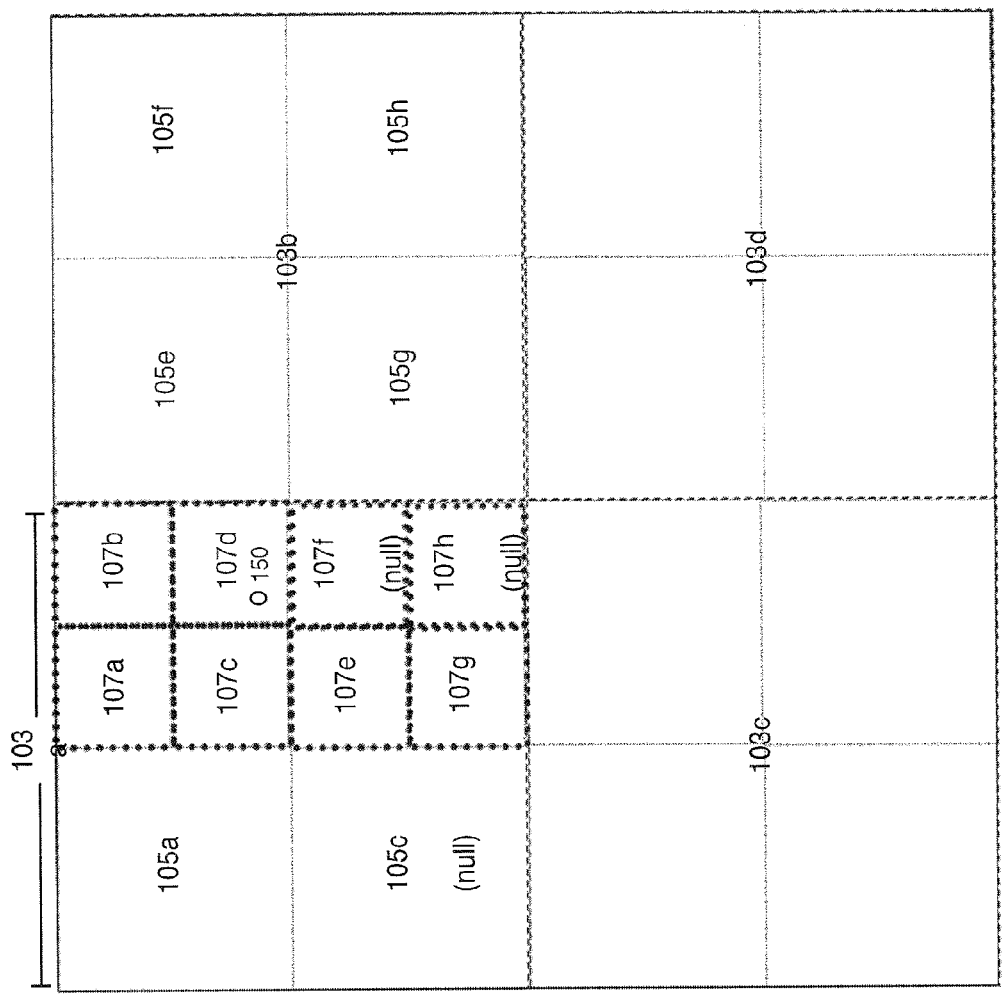
FIG. 1B is an exemplary quadtree structured as a grid.

In the grid representation of a quadtree, the root node is the node covering all data in the quadtree, represented by the overall square 101 in FIG. 1B. The first level of child nodes may be represented by the dashed lines forming four square partitions 103a-103d of the root node, which equally divide the root node. Each first level child node may then itself be divided into four children, which may also be divided into four children. Nodes that have not been further divided are known as leaf nodes. Nodes and leaves may also be known as tiles, owing to their square shape. The highest level of a particular portion of the quadtree may be also known as the resolution of that portion of the quadtree. Quadtrees may have varied resolutions across their structure. In the example of FIG. 1B, in various places, the quadtree's resolution may be as high as 3, or as low as 1. Each node and leaf is represented with a row in a database.

The grid and tree quadtree representations may store identical information. For example, FIG. 1A and FIG. 1B represent the same quadtree, one in grid form and one in tree form.

Figure 2:
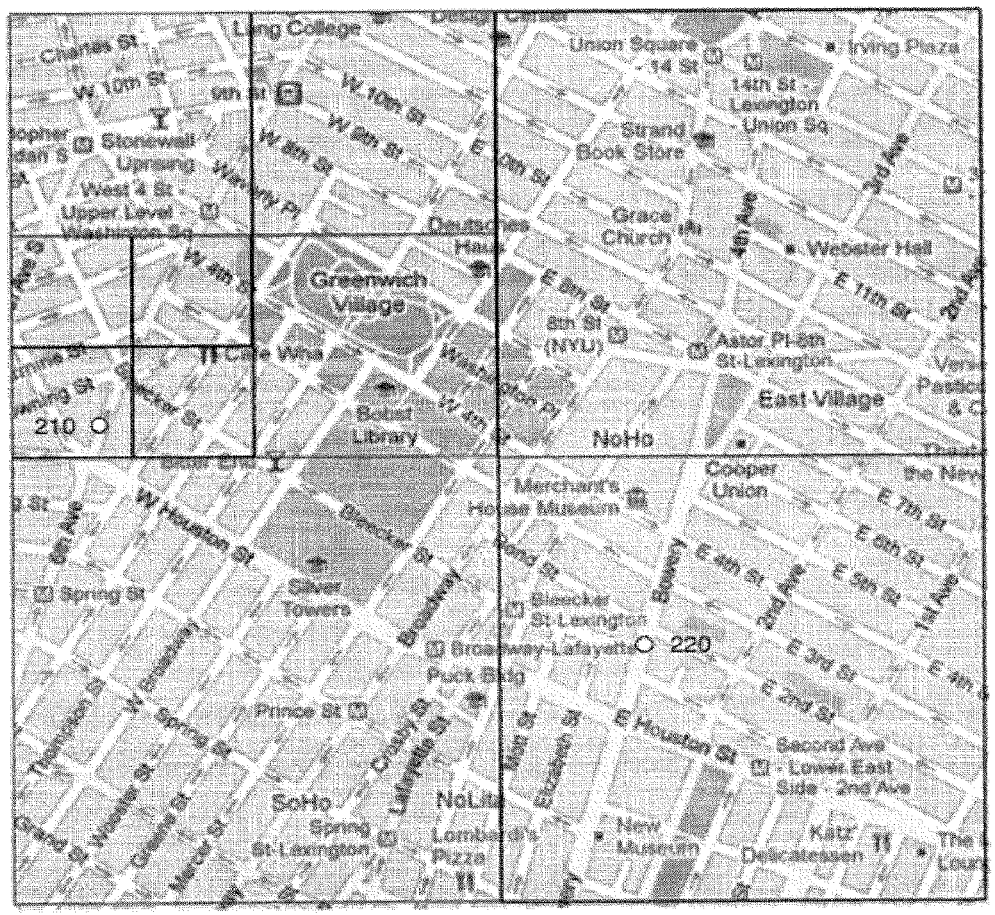
FIG. 2 is an exemplary use of a quadtree structure overlaying a map.

An application of the grid representation of a quadtree may be to store elevation data for points and areas on a two dimensional map. For example, given an area on a two-dimensional map, the area may be divided into four partitions, each partition may be further sub-divided, and data representing the elevation of an area covered by a partition may be stored for each corresponding resulting partition. As an example, FIG. 2 is a map representation of a portion of New York, N.Y. The map is overlaid with a quadtree grid. Each individual square of the grid may be associated with data representing the elevation of the area in that grid. Elevation data may be stored as a raster image, representing a height field of the elevation above sea level. Such data may be stored, for example, in a database. The size of the square covering a particular point indicates that data is available for that specific area. For a particular area, elevation data may be very specific. For example, elevation data may be available for tile surrounding point 210 of FIG. 2. However, for another point 220, very specific data may not be available, and the only available elevation data may be less specific overall elevation of the tile encompassing point 220.

Searching for data in a particular desired node in a quadtree data structure may first start at the root node of the quadtree. Based on the data in the root node, ancestor nodes of the desired node are determined. Traversing the quadtree may require finding each ancestor node covering the desired node, until the desired node is reached. In the grid example, locating a particular node would entail starting at the root node or square covering all nodes, then progressively determining the various smaller nodes covering the desired node. For example, finding node 105h of FIG. 1A, in the best-case scenario, may require four database lookups for a quadtree stored in a database. Similarly, in the grid representation, one must traverse the overall or root node, then each child node until reaching the leaf node with the data of the point desired.

Thus, to determine the elevation of a point on a map, where elevation data is stored in nodes of a quadtree, multiple database lookups may be required, starting at the root node and progressing until the leaf node covering the point is reached. Each database lookup may take a fixed amount of time. Thus, to present the most accurate data to a user, the response time may be affected by the number of lookups to be performed. A large number of database lookups may take too long to be useful to a user.

As will be explained further below, nodes at a particular level of the quadtree storing elevation data may represent the elevation for a particular tile size covering a specific area. An exemplary quadtree may store elevation data for the entire world. Nodes at level 16 of the exemplary quadtree may represent elevation data for a 1 km by 1 km square. At lower levels of the tree, nodes may represent elevation data for larger areas. For example, at level 15, tiles may be 2 km by 2 km; at level 14, tiles may be 4 km by 4 km. These amounts are merely for example purposes and are not limiting in any way. Generally, the higher the level of the node, the more precise the elevation data is.

A complication of storing elevation data in a quadtree is that elevation data may not be available at all levels of the quadtree. Put another way, elevation data in different regions may have different resolution. In the example of elevation data, across the globe, specific elevation data for a point or area may not be available. That is, at some locations, more specific data may be available, whereas less specific detail may be available at other locations. For example, in New York City, very specific elevation data may be available for the entire city, because a large amount of commercially available data exists. In turn, the quadtree portion representing the elevation data for the city may have many levels to properly represent elevation data. For example, data in New York City may allow for elevation data for tiles as small as 1 km by 1 km.

In contrast, specific elevation data for a largely unpopulated portion of the United States may not be available. This may be, for example, because the land has not been surveyed with modern elevation tools, or that data is not commercially available. Thus, the quadtree portion representing that area of the U.S. may only have a few levels of data. Thus, data in Montana, for example, may only allow for elevation data for tiles of 16 km by 16 km.

In both cases, however, the most accurate data is likely desired by the user. Due to the fact that resolution is not consistent across the quadtree, a solution which only searches for tiles or nodes at a specific level may not be useful. For example, always returning nodes at level 16 with elevation data may be useful for an area with high resolution data, like New York City, but would return no data for Montana. Conversely, always returning nodes at level 12 with elevation data would return data for areas of Montana with low resolution, but would result in less-specific data for areas of New York City.

Other solutions, such as traversing the levels of the quadtree until the highest resolution data is retrieved, may require multiple database lookups, as mentioned above. Thus, the ability to quickly retrieve the highest resolution data in a quadtree, with minimal database lookups, may be desired.

Indexing a Quadtree

Figure 3:
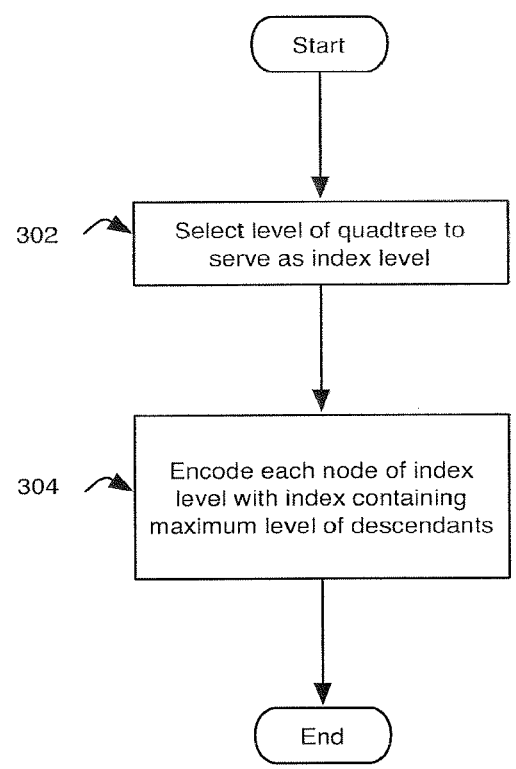
FIG. 3 is a flowchart showing a method for encoding a level of a quadtree with an index.

To reduce the number of database lookups for a point covered by a node in a quadtree, an index may be used. FIG. 3 is a flow diagram for a method 300 of creating an index to enable faster lookup of nodes in a quadtree. Each node in a quadtree has a unique identification.

At step 302 of method 300, a level of the quadtree is selected to serve as the index level. The index level may be selected to be a level of the quadtree that has data for all nodes or most nodes, or may be based on database performance considerations. Selection of such a level allows the index to be used for queries on data contained in substantially the entire tree.

At step 304 of method 300, each node at the index level is encoded with an index. The index contains data representing the highest level of each of the leaf descendants of the index node.

As explained above, FIG. 1A is a sample quadtree. In the sample quadtree of FIG. 1A, level 1 has been selected as the index level. In accordance with an embodiment, level 1 may be selected based on database performance considerations or other factors. Level 2 may not be an optimal index level, for similar reasons.

Because level 1 has been selected as an index level, index nodes I_103a through I 103d of the quadtree are encoded with data representing the maximum level where data exists for each leaf descendant of the index node. As shown in FIG. 1A, the index contained in node I_103a has sixteen entries. The position of each entry in the index represents the position of the leaf node in a pre-order traversal of the sub-tree leaves under the index node. Thus, the fourth position in the array represents the fourth leaf node reached in a pre-order traversal of the leaves of the subtree under index node I 103a, which indicates that the maximum resolution of data at that position is available at level 2, leading to node 105a at level 2. Similarly, at the fifth position of the array, the fifth leaf node reached in a pre-order traversal of the leaves under index node I_103a indicates that the maximum resolution of data at that position is available at level 3, which in turn leads to node 107a.

In an embodiment, the index encoded at step 204 is created as an array. An array data structure is used in many programming languages. The length of the array may be determined to be 4 A (maximum level-index level). This length ensures that the array is of sufficient capacity to store data for all child nodes of the index node. In the sample quadtree of FIG. 1A, the index level is 1, and the maximum level of data is 3. Thus, the length of the index array is 4 A (3−1), or 4 A 2, or 16. As shown in FIG. 1A, the content of node I_103a is a sixteen element array.

Figure 4:
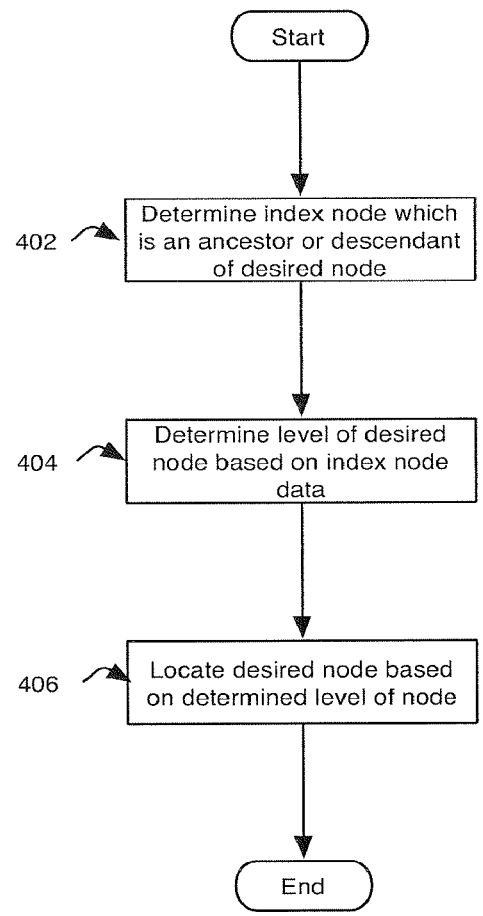
FIG. 4 is a flowchart for a method of searching for data covered by a node in an indexed quadtree.

As stated above, an indexed quadtree may allow for quicker retrieval of the highest resolution data available contained in a leaf node. FIG. 4 is a flow diagram of a method 400 for retrieving a node covering a point in an indexed quadtree stored in a database.

At step 402, the index node covering the desired point is determined. The index node may be an ancestor or a descendant node of the highest resolution node covering the desired point. In many cases the index node is an ancestor of the desired node. As an example, the desired point may be point 150 of FIG. 1B. Thus, index node I_103a may be determined to be the index node covering the desired point in accordance with step 402 of method 400.

At step 404, the level of the desired node covering the desired point is determined from the data in the index node. To retrieve the data stored in the index node, the index node is retrieved from the database. For example, when searching for point 150 of FIG. 1B, the index array contained in index node I_103a may be used to determine that node 107d covers point 150, is at level 3, and should be at position 8 in a pre-order traversal of the leaves of the sub-tree under index node I_103a.

At step 406 then, using an additional database lookup after the lookup of the index node, the node containing data for the particular point may be located and retrieved from the database. The data contained in the located node may be used in a desired application or implementation. For example, if the nodes of the database store elevation data, the elevation of a point covered by the node may be determined based on the data contained in the located node.

The above methods may be useful in quickly determining the elevation of a point on the Earth, where elevation data is stored in the nodes of a quadtree. Each node of the quadtree stores elevation data for an area, which may cover a desired point, and the quadtree is stored in a database.

In the majority of situations, the most accurate elevation data for a point on the Earth is desired. In addition, response time is often of great concern. In the traditional method of querying a quadtree, searching for the elevation of a point in New York City may take an amount of time proportional to the number of levels of the quadtree used to store the elevation data.

In accordance with method 400 of FIG. 4, in an example, a user may want to determine the elevation of a certain point in New York City, such as the elevation of a point on 6th Avenue. Once the user selects the point, it is determined which index node or tile covers the point, in accordance with step 402 of method 400. In a map overlaid with a quadtree, this may be done by determining the tile at the index level covering the point selected by the user.

Once the appropriate index node is determined, the index tile is retrieved from the database to determine the information in the index. Using the information encoded in the index, the highest available level of data covering the specific point selected by the user may be determined, in accordance with step 404 of method 400. In this example, the index may contain an entry for level 17 for an area covering the point selected by the user. In accordance with an embodiment, this entry may be located at a particular place in an index array, corresponding to the location of a leaf in a pre-order traversal of the sub-tree leaves under the index node. Using the place in the index array and the level of the data, the particular tile at level 17 for the node under the index node may be retrieved, in accordance with step 406 of method 400. The data in the retrieved tile may be used to return the elevation of the point selected. For example, elevation may be determined by interpolating a raster image.

In an embodiment, a quadtree containing elevation values stored in a database may contain two or more types of rows. One type of row, containing elevation or terrain data, may be indexed using the position of the point or area covered, and contain a column with elevation data for that point or area.

The position of the point or area covered may be expressed as latitude and longitude coordinates, but is not limited in this or any other manner.

Another type of row stored in the database, index rows, may contain the highest resolution level at which elevation data is present under an index node. Index rows may also be indexed using the position of the area covered by the index tile. The index rows may also contain a column consisting of an array corresponding to the level of all descendants of the quadtree.

In a quadtree stored in a database, each entry or row, representing a node or leaf, may be prefixed with the level of the data at that node or leaf. For example, in a quadtree with 18 levels, each row may be prefixed with a letter of the alphabet representing the level of the data in the node, starting at zero (the root node), prefixed with the letter A. For example, nodes at level 15 may be prefixed with the letter P. Similarly, nodes at level 16 may be prefixed with the letter R.

Index nodes created according to embodiments described herein then may be prefixed with the index level selected. Additionally, the index nodes may contain an array with information related to the level of each leaf node under the index node. Prefixes of index nodes may be also include data indicating that the node is an index node, to differentiate from elevation or terrain data nodes.

For example, if the index level is selected to be 13 for a portion of data, the key of the row may include the letter N (representing 13) as well as the position of the index tile corresponding to the area covered by the index tile. The array may contain 16 entries to have sufficient space to store information for all descendant nodes of the index node.

If data is available at level 15 for a particular area, the index node array may contain a value of 15. For example, the first leaf descendant node of the index node may be at level 15, and thus the array will begin with 15. For the next three descendant nodes, data may only be available at level 14. Thus, the next three entries in the array will read [14,14,14]. Data may only be available at the index level for the remainder of the array, and thus the remainder of the array will be filled in as 13. The resulting array will be [15,14,14,14,13,13,13,13,13, 13,13,13,13,13,13,13].

Thus, when determining the elevation of a point covered by a tile at level 15, for example, tile P0489426140000000, the first database lookup may be to determine the index node covering the point. The first lookup may return index tile row N0489426400000000, with an associated array [15, 14, 14, 14, 13, 13, 13, 13, 13, 13, 13, 13, 13, 13, 13, 13]. Upon finding that the particular point for which elevation data is requested has elevation data available at level 15, the ensuing database lookup may retrieve the tile at level P, which would follow to be P0489426140000000. Once the tile is looked up, the elevation data contained in the row representing the tile may be returned to the user.

Figure 6:
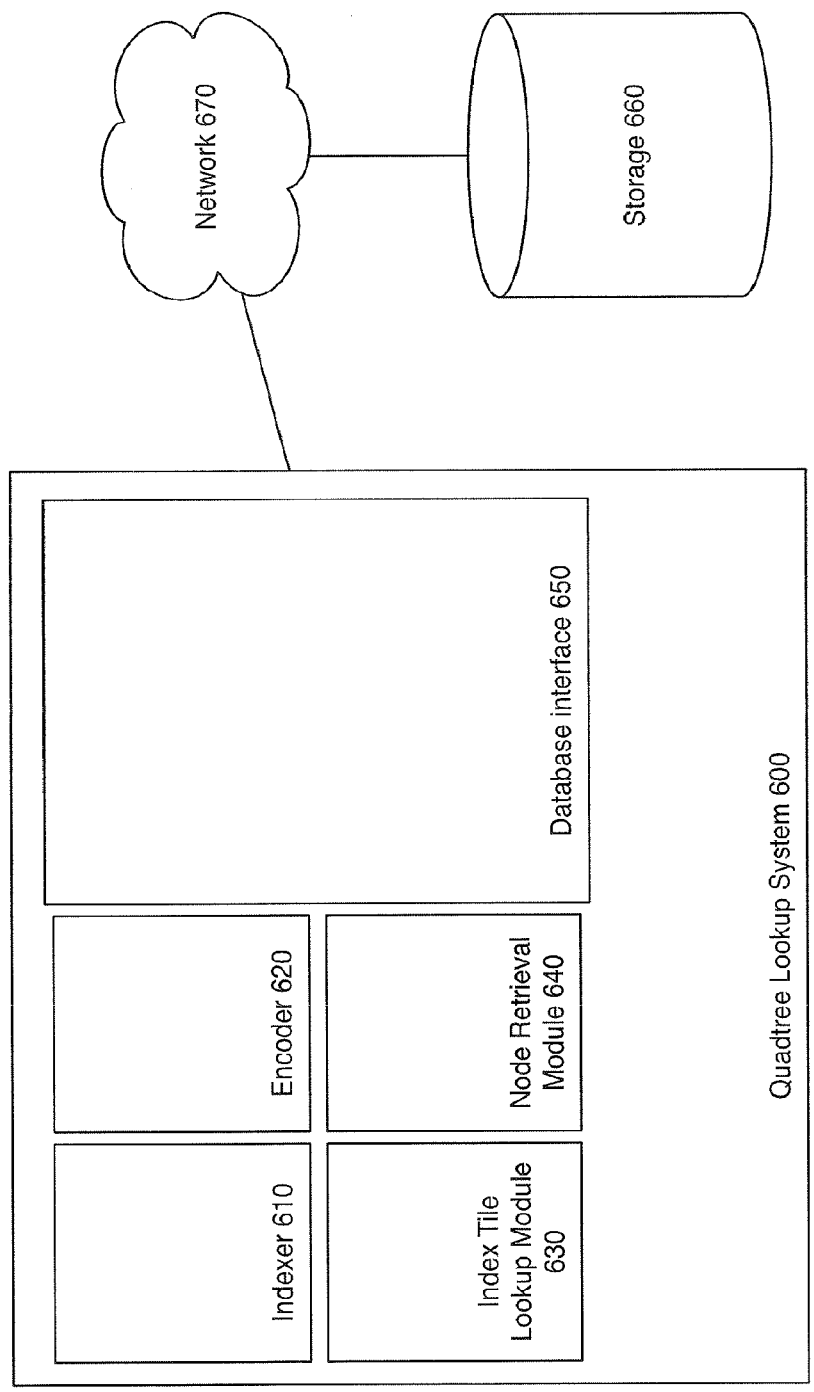
FIG. 6 is a diagram of a quadtree lookup system.

A system that may employ the methods in FIGS. 3 and 4 is illustrated in FIG. 6

FIG. 6 is a diagram of a quadtree lookup system 600 that may be used to implement embodiments disclosed herein. System 600 includes an indexer 610. Indexer 610 may be configured to select an appropriate level of the quadtree to serve as an index level in accordance with various embodiments disclosed herein. For example, indexer 610 may select an index level based on database performance requirements or other desired features. Indexer 610 may further be configured to write or append rows to a database representing nodes at the index level in a quadtree stored in a database.

System 600 also includes an encoder 620. Encoder 620 may be configured to encode nodes at the index level with an index containing data which represents the maximum level of each leaf beneath each index node, or data representing the maximum level of each parent node above each index node. In accordance with embodiments, the index may be encoded as an array. Encoder 620 may be configured to associate the index with the appropriate index rows created by indexer 610. Encoder 620 may, for example, operate according to the method described in FIG. 3.

System 600 may also include an index tile lookup module 630. Index tile lookup module 630 may determine a particular index tile covering a point selected, for example and without limitation, by a user. The selected point may be the point for which the user desires elevation information. Lookup module 630 may, for example, operate according to the methods described in FIG. 4 or FIG. 6.

System 600 may also include a node retrieval module 640. Node retrieval module 640 may utilize the information from index tile lookup module 630 to retrieve a particular index node from a database or other storage. Using the data stored in an index node, node retrieval module 630 may also retrieve a node at a resolution level specified in a retrieved index node, in accordance with embodiments described herein.

System 600 may also include a database interface 650. Database interface 650may be employed to communicate with a database storing quadtree nodes to encode index nodes in accordance with encoder 620 or to retrieve appropriate nodes in accordance with node retrieval module 640. In accordance with an embodiment, database interface 650 may also be employed to determine the number of database lookups, whether for index nodes or tiles or other nodes, for a particular query, and determine whether the number of database lookups exceeds a specified threshold. Database interface 650 may be employed to limit the number of database lookups beneath a threshold.

System 600 may be connected to a network 670, such as a local area network, medium area network, or wide area network such as the Internet. Storage 660 may be connected to network 670 and may be a database storing quadtree nodes.

System 600 may be implemented on any computing device. Such a computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Querying Multiple Points in a Quadtree

As detailed above, elevation data may be useful to determine the elevation of a particular point on the Earth. Another use of elevation data may provide the ability to determine the elevation along a path. For example, a hiker may wish to determine the elevation of a desired path up a hill or mountain. To do so, he may specify a number of points indicating the route he plans to take up the mountain. Querying multiple points in a quadtree to determine the elevation of each point may be a time consuming process. As specified above, response time is often of concern to the user. To return the best elevation data in the quickest time possible, occasionally, a tradeoff between accuracy and time is necessary. Since the number of database lookups often is directly related to performance of a particular query, optimizing for performance often includes limiting the number of database lookups below a threshold. To return the best elevation data within a reasonable response time, a method of quickly querying multiple points in a quadtree stored in a database may be needed.

Figure 5:
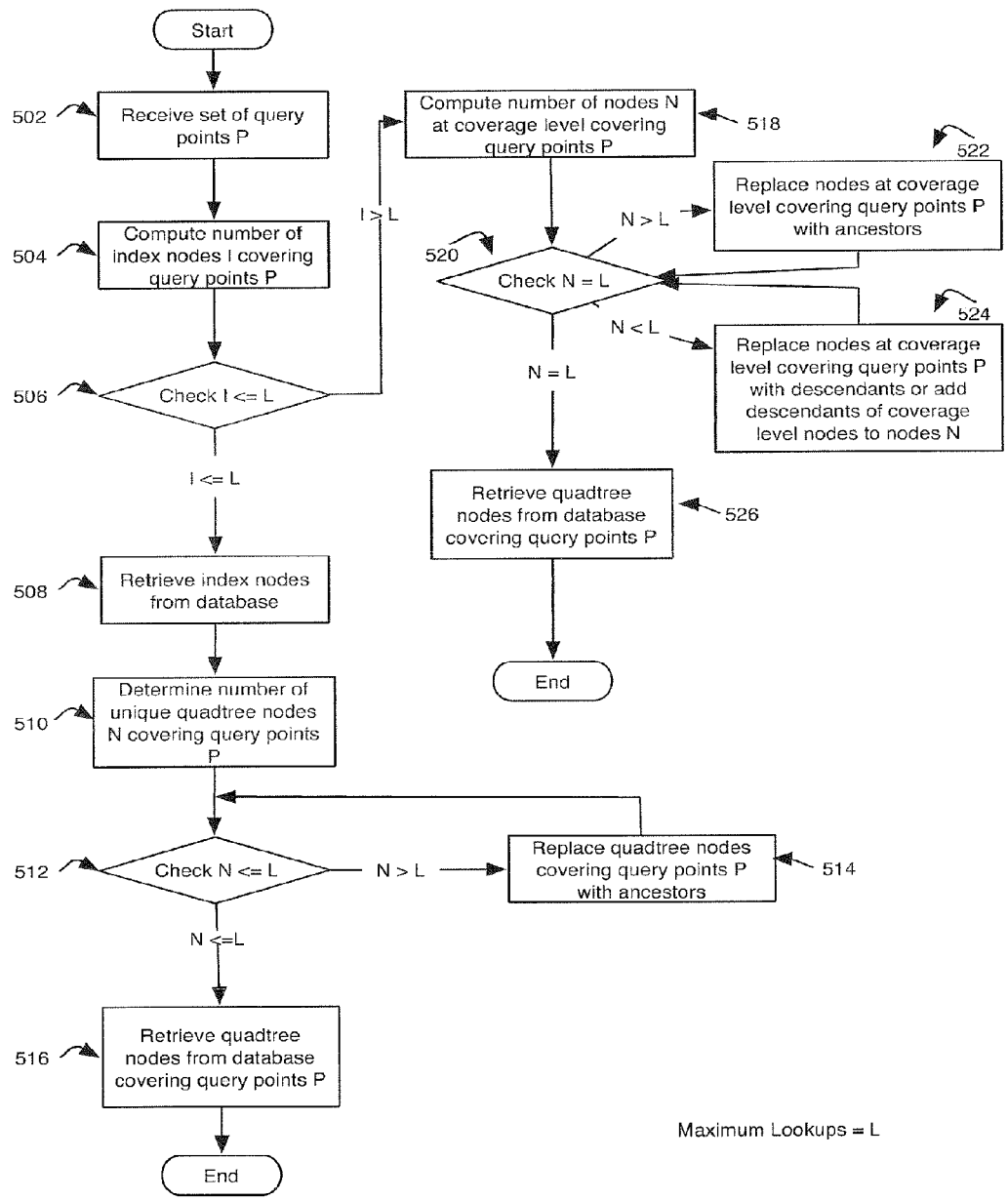
FIG. 5 is a flowchart for a method of retrieving data from multiple nodes in a quadtree while minimizing the number of database lookups.

FIG. 5 is a flow diagram for a method 500 of retrieving multiple points from a quadtree stored in a database while limiting the maximum number of lookups in the database. At step 502, a set of query points P is received from a user. The query points may be multiple points along a path specified by a user. In some cases, the user may only specify a few points along a path to determine the elevation. In other cases, a user may specify a large number of points, or may specify a long distance requiring multiple query points.

At step 504, the number of index nodes I covering query points P is calculated. The index nodes contain data representing at which level the maximum resolution data is available under the index nodes, and will be used to return to the user the most accurate data available.

At decision block 506, the number of index nodes I is checked against the maximum number of lookups L. The maximum number of lookups may be previously specified and constant, or may be changed depending on the desired response time. If the number of index nodes is less than or equal to the maximum number of lookups, the method proceeds to step 508.

At step 508, the index nodes covering query points P are retrieved from the database. Based on the data in the index nodes retrieved from the database, at step 510, the number of unique quadtree nodes at the highest resolution available covering the query points P is determined. The highest resolution quadtree nodes containing elevation data will provide the best resulting elevation along the path to the user, but retrieving all such nodes may take more lookups than a defined threshold. A large number of lookups may take a correspondingly large amount of time.

Thus, at decision block 512, the number of unique quadtree nodes N is compared against the maximum number of lookups L. If the number of unique quadtree nodes N is less than or equal to the maximum number of lookups, the method proceeds to step 516.

At step 516, the quadtree nodes covering the query points P are retrieved from the database. The elevation data contained in the retrieved quadtree nodes can then be used to calculate the elevation along the path specified by the user.

If, at decision block 512, the number of unique quadtree nodes covering query points P is greater than the maximum number of lookups, the method proceeds to step 514. Although in the best case scenario, the highest resolution data is returned to the user, performance concerns dictated by the maximum number of database lookups may not make this possible. For example, if the maximum number of lookups is 10, and the number of unique quadtree nodes at step 510 is 12, the method may proceed to step 514. To reduce the number of database lookups, at step 514, the quadtree nodes determined at step 510 are replaced by their ancestors, which have lower resolution elevation data covering a larger area. For example, the quadtree nodes determined at step 510 may have included two nodes containing elevation data for two contiguous areas, each of size 1 km by 1 km. At step 514, those two nodes may be replaced by a one node containing data for an area 2 km by 2 km, covering both smaller nodes, to reduce the number of database lookups. Quadtree nodes are replaced with their ancestors at step 514 until the number of nodes to be retrieved from the database is less than the maximum number of lookups.

Once the number of nodes to be retrieved from the database is less than the number of lookups, the nodes are retrieved from the database in step 516. Again, the data contained in the retrieved quadtree nodes can then be used to calculate the elevation along the path specified by the user.

At step 506, if the number of index nodes I covering query points P calculated at step 504 is determined to be greater than the maximum number of lookups L, the method proceeds to step 518. At step 518, the number of nodes N at the coverage level covering all query points P is calculated. The coverage level is the level at which data exists for all points stored in the quadtree. For example, while the index level may be 10 in an implementation, certain nodes at the index level may refer to parent or grandparent tiles containing data if the index level tile does not have elevation data. For a quadtree with an index level of 10, the coverage level of the quadtree may be 7. That is, at level 7 of the quadtree, all nodes spanning the quadtree contain elevation data.

Thus, as stated above, at step 518, the number of nodes N at the coverage level is determined. At decision block 520, N is compared to the maximum number of lookups L. At this point, if the number of nodes N is equal to the maximum number of lookups L, the method proceeds to step 526, and the quadtree nodes at the coverage level are retrieved from the database. Based on the data in the quadtree nodes, the elevation of the points along the path is interpolated and presented to the user.

If, at decision block 520, the number of nodes N at the coverage level is less than the maximum-number of lookups L, the possibility exists that better resolution data can be presented to the user while maintaining performance. Thus, the method proceeds to step 524. At step 524, particular nodes at the coverage level determined at step 518 may be replaced with their descendant nodes, or such descendant nodes may be added to a list of nodes to be retrieved, if descendants exist. Recall above that the descendants of a node store elevation data for a smaller tile, representing more specific data. Thus, for example, a tile at level 7 (the coverage level) may represent an area which is 32 km by 32 km. Replacing the tile at level 7 with its descendant at level 8 covering the same area may return the elevation for a 16 km by 16 km area. The operation at step 524 may replace nodes at the coverage level with their descendants, or simply add descendant nodes to be retrieved, until the condition at step 520 is satisfied. That is, coverage nodes are replaced with descendants or descendant nodes are added until the number of nodes N is equal to the maximum number of lookups L. Descendants may be chosen to cover the maximum number of query points possible to present the user with the best quality data available. Descendant nodes may not exist below certain coverage level nodes. In this case, the coverage level nodes will not be replaced.

Once the maximum number of lookups is reached, the nodes N are retrieved from the database, and the elevation of the points along the path is interpolated from the data in each node.

In another scenario, if the number of nodes at the coverage level is greater than the maximum number of lookups, the method 500 proceeds to step 522. At step 522, the nodes at the coverage level are replaced with their ancestors to reduce the number of lookups performed on the database. Extending the example detailed above with respect to step 514 and 524, at level 7, tiles may represent an area which is 32 km by 32 km. Tiles at level 6 may represent an area which is 64 km by 64 km. Two level 7 tiles covered by the same parent tile at level 6 may be replaced with the parent tile at level 6 to reduce the number of lookups performed on the database by 1. This process at step 522 is repeated until the condition of step 520 is satisfied. That is, nodes at the coverage level are replaced with their ancestors until the number of nodes N is equal to the maximum number of lookups L.

Once the maximum number of lookups is reached, the nodes N are retrieved from the database, and the elevation of the points along the path is interpolated from the data in each node.

In an embodiment, depending on the implementation of method 500, the maximum number of lookups may vary based on various criteria. For example, the maximum number of lookups at step 506 that is used to determine whether index nodes are retrieved from the database may be more or less than the maximum number of lookups used at step 512 to determine whether to replace quadtree nodes with their ancestors.

Example executions of method 500 may take place for a particular user planning a number of trips. A system implementing method 500 to return elevation data to users may have the maximum number of database lookups set to be 10.

In one example, the user may be planning a five block long walk around his neighborhood, and select a set of five points P marking the intersections he will reach along his way. A system implementing method 500 may receive points P in accordance with step 502, and compute the number of index tiles covering points P to be four, in accordance with step 504. Since four is less than the maximum number of database lookups 10, the index nodes are retrieved from the database, in accordance with step 508.

Based on the data in the index nodes, the system may determine that 5 unique quadtree nodes cover the points P specified by the user, in accordance with step 510. Since five is less than the maximum number of database lookups 10, the quadtree nodes are retrieved from the database in accordance with step 516, and elevation data from the nodes may be presented to the user.

In another example, the user may be planning a long bike ride covering 20 kilometers, and specify 25 points P along his path. In accordance with step 504, the number of index nodes covering the points P may be nine. Thus, the system implementing method 500 will retrieve the index nodes from the database and determine the number of quadtree nodes N covering the points P.

Based on the data in the index nodes, the system may determine that 14 unique quadtree nodes cover the points P specified by the user. Each quadtree node may cover a 1 km by 1 km area. Since the number of unique quadtree nodes is greater than the maximum number of lookups, the unique quadtree nodes are replaced with their ancestors until the number of nodes is less than or equal to 10. For example, four pairs of two nodes may be replaced with their ancestors to reduce the number of unique quadtree nodes to 10. The 10 quadtree nodes may then be retrieved from the database, and elevation data from the nodes may be presented to the user.

In a third example, the user may be interested in determining the approximate elevation from his home to a location in another state. Because the area covered by his query points P is so large, the number of index nodes covering his query points may be greater than the maximum number of lookups 10. Thus, in accordance with step 518, the number of nodes at the coverage level may be calculated. If the number of nodes at the coverage level still exceeds the maximum number of lookups, the nodes at the coverage level will be replaced with their ancestors until the number is reduced to 10. Conversely, if the number of nodes at the coverage level is less than the maximum number of lookups, the descendants of the nodes at the coverage level may be retrieved until the number of nodes retrieved is 10. Once the appropriate nodes are retrieved from the database, the elevation data may be presented to the user.

In the third example, the exact elevation data for the user's path may not be presented. However, the user will be presented this data as quickly as any other path, because the number of database lookups is limited. Additionally, it may be unlikely that the user requires such specific elevation data for his path.

In an embodiment, to improve performance of the database lookups, the various database lookups may be performed in parallel over distributed systems. Thus, for example, if data stored in the quadtree database is replicated over multiple database machines, each individual lookup may be performed by an individual database machines, further reducing the time necessary for the total number of lookups.

Area Queries

Another use case of elevation data stored in a quadtree is to provide the capability to determine the elevation over an area. For example, a user may wish to learn the elevation of a selected rectangular area covering an area of the Earth.

In an embodiment, an indexed quadtree may be utilized to provide elevation data for an area to a user. Given a user-selected area, such as a rectangle, index tiles that overlap the points covered by the user-selected area may be determined. Using the data stored in each index tile, the highest levels at which elevation data is available can be determined. For example, the index tiles may contain data indicating that data is available at level 12 for certain points covered by the user-selected area, and that data is available at level 10 for other points covered by the user-selected area.

To return the best data possible to the user, elevation data at level 12 may be returned to the user. Thus, the tiles at level 12 containing elevation data may be retrieved to determine the elevation of points covered by those tiles. However, because data is only available at level 10 for certain points covered by the user-selected area, data in those tiles may be retrieved and super-sampled to estimate the elevation data that would be available at level 12. Known methods of super-sampling may be utilized to effectively estimate the elevation data that would be available at a higher level. Elevation may be returned as a raster image, representing a height field of the elevation in the query area above sea level.

Conclusion

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed:

1. A computer implemented method of determining the elevation of a point, where the elevation of a first area containing the point is stored in a database in the form of an indexed quadtree, the method comprising:
    determining from the database, using a computer processor, an index node that is an ancestor of a node containing the elevation of the first area at a maximum resolution available for the first area within the indexed quadtree;
    determining from the database, using a computer processor, a level of the node containing the elevation of the first area at the maximum resolution available for the first area based on data that is contained in the index node, wherein
        (i) the data contained in the index node includes an index having at least E elements, E being greater than a total number of child nodes stemming directly from the index node,
        (ii) each of the E elements specifies a level of the indexed quadtree at which elevation information for a respective area is stored at a maximum resolution available for the respective area within the indexed quadtree, and
        (iii) one of the E elements specifies the level of the node containing the elevation of the first area at the maximum resolution;
    locating within the database, using a computer processor, the node containing the elevation of the first area at the maximum resolution based on the determined level of the node;
    interpolating the elevation of the point based on the elevation of the first area at the maximum resolution available for the first area contained in the located node; and
    providing the interpolated elevation of the point, or another elevation calculated based on the interpolated elevation of the point, for presentation to a user.

2. The method of claim 1, wherein the index is an array.

3. The method of claim 2, wherein the index is stored in the database.

4. The method of claim 2, wherein the array is of sufficient capacity to contain the level of all leaf descendants or node ancestors of the node containing the elevation of the area.

5. The method of claim 1, wherein the quadtree is stored in the database.

6. A computer system for determining the elevation of a point, where the elevation of a first area containing the point is stored in an indexed quadtree, comprising:
    one or more computer processors; and
    a program memory storing executable instructions that when executed by the one or more processors cause the computer system to:
        determine an index node that is an ancestor of a node containing the elevation of the first area at a maximum resolution available for the first area within the indexed quadtree;
        determine a level of the node containing the elevation of the first area at the maximum resolution available for the first area based on data that is contained in the index node, wherein
            (i) the data contained in the index node includes an index having at least E elements, E being greater than a total number of child nodes stemming directly from the index node,
            (ii) each of the E elements specifies a level of the indexed quadtree at which elevation information for a respective area is stored at a maximum resolution available for the respective area within the indexed quadtree, and
            (iii) one of the E elements specifies the level of the node containing the elevation of the first area at the maximum resolution;
        locate the node containing the elevation of the first area at the maximum resolution based on the determined level of the node;
        interpolate the elevation of the point based on the elevation of the first area at the maximum resolution available for the first area contained in the located node; and
        provide the interpolated elevation of the point or another elevation calculated based on the interpolated elevation of the point, for presentation to a user.

7. The system of claim 6, wherein the index is an array.

8. The system of claim 7, wherein the array is of sufficient capacity to contain the level of all leaf descendant or node ancestors of the node containing the elevation of the area.

9. The system of claim 7, wherein a key of a database schema used to store the array comprises the level of the node.

10. The system of claim 6, wherein the quadtree is stored in a database.

11. The system of claim 6, wherein the index is stored in a database.

* * * * *